United States Patent Office 3,399,136
Patented Aug. 27, 1968

3,399,136
REMOVAL OF BACTERIA FROM AQUEOUS LIQUIDS BY FILTRATION
George Richard Bell, Martinsville, N.J., assignor to Johns-Manville Corporation, New York, N.Y., a corporation of New York
No Drawing. Filed Oct. 20, 1965, Ser. No. 499,033
5 Claims. (Cl. 210—50)

ABSTRACT OF THE DISCLOSURE

Water contaminated with bacteria and viruses is purified by adding iron or aluminum compound in an amount sufficient to combine with substantially all of the bacteria and viruses, and then treating the water to remove the iron or aluminum ion. Iron or aluminum ion additions are preferably about 1 to 5 p.p.m. of water. A preferred technique for removing the iron or aluminum is to add a filter aid and a compound such as magnesium oxide which will unite with the iron or aluminum ion to form a substance which can be removed by filtration.

---

This invention relates to the removal of bacteria and similar microbes from water supplies. The invention further relates to new filter aid filtration techniques for effectively achieving this removal, and the process for preparing novel filter aids. The technique is effective for waste water, well water supplies, and other aqueous mediums and is specifically adapted to filter aid filtration.

The process of filtration for removing suspended materials from a liquid by forcing liquids under pressure through a filter medium is well understood. Various structures have been proposed to effect this, including sand filters. These particular structures, however, have the disadvantage of having such low capacity that large areas and expensive construction are required, and more significantly, have the disadvantage of the inability to handle many types of contamination found in water supplies. Advances over the basic sand filters have involved a technique of pre-treatment, whereby the suspended material would be first treated so as to collect or coalesce into sufficiently large agglomerates as to settle out and be removed in advance of the sand filter. These pre-treatment techniques, in effect, removed the contaminants prior to the liquid being passed through the filter medium.

In addition to the above-described classic techniques for treating liquids, the principle of filter aid filtration has in recent years demonstrated many advantages in removing certain impurities from liquids. Materials most generally used as filter aids are diatomaceous silica, perlite, carbon, and fibrous matter, such as asbestos and cellulose. The unique properties of these materials, their fineness, diversity of shape and compressibility, etc., make them unique for this purpose. A particularly important feature of the filter aid filtration is that the pores in the surface of the filter aid cake are generally far smaller than those of the filter medium which enables the removal of a very substantial portion of suspended particles. The portion removed will, of course, be a function of the size and the nature of the particles being filtered and the porosity and clarifying ability of the particulate filter aid.

In order to increase the efficiency of filter aid materials, it has also been taught that various chemical compositions may be coated upon or physically mixed with the filter aid. This has improved the clarifying and filtration rate characteristic of the filter aid.

The adequacies of these modern water filtration processes, however, have been somewhat deficient in certain areas. Specifically, these filter aids or coated filter aids have not met with success to remove adequately water-borne bacteria, and particularly, pathogenic viruses. Consequently, this has been a deterrent to the use of filter aid filtration of surface water supplies inasmuch as many of these supplies have been polluted by sewerage containing pathogenic bacteria. While it is recognized that proper selection of the filter aid could provide an effective bar to the passage of microorganisms of the coliform group into the filtered water, the filter resistance of the chosen material in itself would be a deterrent to its use. That is, the filer aid head loss would be so excessive as to render the filtration cycle short and impractical.

In some circumstances pathogenic viruses in water have been destroyed by chlorination and by flocculation with various chemicals. Pre- or post-chlorination or both, with appropriate detention, are standard practices and have been accepted in certain areas by Public Health authorities as a primary means of control. The published information about the mechanisms of virus control by certain metallic ions and their subsequent use in floc formation appears to present a reasonable degree of additional protection over and above the primary protection provided by chlorination. A leading article on this subject is presented by Chang et al. in the American Journal of Public Health, vol. 48, No. 1, January 1958, pp. 51–61, and No. 2, February 1958, pp. 159–169, entitled "Removal of Coxsackie and Bacterial Viruses in Water by Flocculation." A distinct disadvantage of the Chang technique is the necessity to fluocculate twice and for extremely extended periods of time. Thus, while acceptable to some degree for academic exercises, the technique has been of little practical and commercial significance.

It is, therefore, a principal object of this invention to provide a practical and economical means whereby the disadvantages of the foregoing bacterial removal processes may be overcome.

It is a further object of this invention to provide a filter aid filtration method of clarifying and substantially purifying water supplies, whereby maximum bacterial removal effectiveness is achieved.

It is another object of this invention to provide a new filter aid filtration method of providing substantially bacterial-free water supplies which process will function economically in accordance with the advantages mentioned in the foregoing objects.

It is another object of this invention to provide a practical means of purifying virus contaminated water sources to render it useful for both potable and sensitive industrial purposes.

Additional objects and further scope of applicability of the present invention will become apparent in the detailed description given hereinafter.

It has now been determined that the foregoing objects may be satisfied and the above-mentioned problems overcome by providing a novel filter aid filtration method of treating bacterial contaminated water supplies. It has been discovered that by utilizing an appropriate chemical additive such as iron or aluminum, which appear to combine chemically with the bacterial organisms, it is possible to remove bacterial effectively by subsequently treating the iron treated water with presently available techniques for removing the ions.

The amount of ions added is dependent upon the concentration of the bacterial and virus contamination but between 1 and 5 parts ions per million parts of water will perform satisfactorily in most instances.

A preferred technique for treating iron contaminated water is set forth in U.S. Letters Patent application Ser. No. 249,782, filed Jan. 7, 1963, now Patent 3,259,571. This process involves the new concept of preconditioning water, and specifically removes iron by a process comprising the preferential addition of filter aid and a small amount of ingredients comprising powdered active magnesium oxide under agitation and nominal retention, followed by standard filter aid filtration.

This, of course, is only one specific technique for removing iron, and while this technique is preferred for purposes of the instant invention, it should be understood that other available techniques may be likewise applicable. Inasmuch as the filter aid—magnesium oxide combination has a high degree of iron removal efficiency, substantial bacterial removal is achieved with a small addition of iron ions.

It has also been determined that further advantages may be obtained if a precoat of filter aid and powdered magnesium oxide is used.

The amount of active magnesium oxide used varies in accordance with the amount of iron contaminant and the desired degree of removal to be accomplished. The amount of magnesium oxide required, while a function of the form of the material, i.e., fineness of division, degree of purity, etc., is not necessarily stoichiometric with respect to the amount of iron to be removed. However, it has been found that between 1.0 and 60 parts per million of liquid to be filtered are generally sufficient to reduce a normal contaminant concentration of iron to acceptable drinking water standards of the U.S.P.H.S. or less. By active magnesium oxides is meant magnesium oxides capable of reacting with the iron of a water supply and includes those resulting from calcination of naturally occurring or chemically precipitated magnesites or magnesium carbonates, and partially calcined dolomite (calcined to decompose the magnesium carbonate but not the calcium carbonate), and other forms of chemically prepared magnesium oxide, e.g., calcined magnesium hydroxide.

The filter aid used in the body feed may be any one of the commercially available filter aids such as diatomaceous silica, perlite, or other filter aids or mixtures of the same. The amount of filter aid added is again dictated by the liquid being treated and the desired result. However, it has been found that between 5 and 100 parts per million of liquid to be filtered is generally satisfactory with the above-described amount of magnesium oxide.

A second technique for removing the iron ions is discussed in U.S. Letters Patent application No. 284,884, filed June 6, 19683, now Patent 3,235,489. This technique also utilizes the concept of preconditioning the water. Specifically, the contaminated water to be filtered is first treated with an appropriate alkali or mixture of alkalis, of which the naturally occurring alkalinity of the water may form a part, to impart a pH between 7 and 9 so as to form a precipitate of the iron. The added alkali is so selected as to be a slow reacting material, e.g., $Na_2CO_3$, CaO, $Ca(OH)_2$ and the addition controlled so as to attain, with continued agitation for the preconditioning period, which may vary between about 5 to about 15 minutes, a stable pH level within the above range. Filter aid is added substantially simultaneously with the alkali and the resulting preconditioned water subjected to filtration without prior settling. The governing conditions for the preconditioning operations can have considerable latitude so long as the primary objective of precipitating part of the iron in a filterable form is attained. A significant feature of this technique is that it is neither necessary nor desirable to precipitate all of the iron prior to removal. To do so tends to produce the fully oxidized and fully hydrated iron oxide which is difficult to filter. It has been demonstrated that less highly oxidized or hydrated iron oxides have substantially lower filtration resistance and in addition have the property of removing substantial quantities of iron directly from solution by the filter aid filtration. Filtered water iron levels of less than 0.1 part per million and frequently so little as to be undetectable by usual methods can be attained.

The exact nature and amount of alkali used varies according to the amount of iron contaminate and the desired final state of the iron. However, it has been found that amounts between 2.5 and 60 parts per million of liquid to be filtered are generally sufficient to provide a pH of between about 7 and about 9 and to reduce the iron concentration to or below the acceptable drinking water standards of the United States Public Health Service. The choice of alkali material is such as to be water soluble and slow reacting, and to produce a filterable hydrate. It has been found that this group of materials consists of alkali metal and alkaline earth metal carbonates, e.g., $Na_2CO_3$, alkaline earth metal hydroxides, e.g., $Ca(OH)_2$, alkaline earth metal oxides, e.g., CaO, alkali metal aluminates, alkali metal ferrates, and mixtures thereof. The amount and selection of filter aid for this technique is the same as that noted above.

The above-described method for removing bacteria from water supplies, i.e., the Chang et al. technique, is accomplished by the addition of aluminum or iron salt which is then reacted with alkali (natural or added) to form a flocculant precipitate. The mechanism by which the floc retains bacteria has been the object of much conjecture and some work, but is still not well detailed. The hypothesis put forth, however, suggests that a complex is formed with the protein of the organism which persists even after the trivalent metal hydrate floc is formed. The major difficulty with this technique, however, resides in the relatively difficult filterable natural of the metal hydrate floc, in addition to the necessity to flocculate twice and for impractical periods of time. Accordingly, it has been suggested that the floc be settled out as much as is practicable and that only the supernatant be filtered. As is recognized in the art, even under settled supernatant circumstances, filtration may be impractical when the floc is to be removed as a discrete particle. Sand filters also have disadvantages since accumulation of bacterial containing floc can be carried through the entire depth of the sand and into the filtered water.

In developing the instant technique, the evaluation was made of presently available diatomaceous silica filter aids. A high clarity, low filtration aid product, sold under the trademark Standard Super-Cel was tested, and it was determined that it itself effectively retained organisms of the coliform group. Successively less retention was obtained as permeability of the available grades increased. This is consistent with the understanding in the technology that increased permeability is the result in part of increased pore size. While the Standard Super-Cel diatomaceous silica may have some utility for specialized filtration application, the large scale use is prohibited by the filtration resistance of the filter aid itself.

In evaluating the instant invention, 5 p.p.m. Fe as ferric chloride were initially added to contaminated water, but it was difficult to obtain complete removal of this high level iron from the filtered water. Refinement was made by lowering the level of iron addition to the order of about 1 part per million as Fe and with various grades of diatomaceous silica filter aid and calcined magnesite added to assist in the removal of bacteria. With 1 part per million iron added, either as ferrous or ferric, it was established that various grades, e.g., Hyflo Super-Cel, Celite 503, and Celite 545 filter aids, could be used to obtain the same degree of coliform removal as was obtained with the Standard Super-Cel filter aid per se. Hyflo Super-Cel has approximately 250 percent faster flow rate than Standard Super-Cel; Celite 503—178 percent faster than Hyflo Super-Cel; and Celite 545—456 percent faster than Hyflo Super-Cel.

The comparative results for the standard filter aid and filter aids using the instant invention, are set forth in Tables 1 and 2 herein. The evaluation of the invention was effected by innoculating tap water with settled domestic sewerage as a source of coliform organisms. It was difficult to predict with any degree of reliability the number of coliform organisms present in the sewerage samples. Accordingly, a considerable number of tests were run with the purpose of observing the removal over a wide range of the influent coliform levels. Effluent samples were retained at relatively short intervals at the beginning of the filter run and somewhat longer intervals thereafter. These filtration units had, in addition to body feed pumps, provisions for adding chemicals when required.

At least two different volumes of influent and effluent were filtered through a millipore filter. The filter was placed on an absorbent pad saturated with MF Endobroth and incubated at body temperature for 20 hours. The colonies exhibiting the characteristic sheet were considered the coliform organisms. The coliform organisms in the influent were the average of those found in the mixing tank after innoculation with settled sewerage at the start of the filter run, after two hours, and after four hours. There was little change in the influent coliform level appearing at these various times. The effluent levels were measured at various time intervals. The evaluation indicated that up to certain influent coliform densities, a filter aid will remove sufficient coliform organisms to give results indicating zero coliform per 100 ml. in the effluent. As the influent coliform increase after this point, the coliform levels of the effluent also increase so that the greater the influent concentration of organisms, the greater the concentration of organisms in the effluent. This is set forth in Tables 3 and 4. These tables also indicated that as the premeability of the filter aid increased, the coliform level of the effluent increased with similar influent concentration.

Regarding the concentration of the body feed, no significant effects were noted while the range was maintained between about 7 and about 60 mg. per liter. Values around 30 mg./liter gave satisfactory results and, therefore this level was used to provide uniformity.

A series of runs was also conducted to evaluate the effectiveness of formation of the iron complex with the microorganisms. In these runs, $FeCl_3$ was used as a source of iron and it was added to the pre-coat pot so there was a contact time of about 10 minutes before filtration. In one run, no additional alkali was used; in the other runs, MgO was used to precipitate the iron and facilitate its removal. The results obtained in these studies are set forth in Table 4. Tests were also run using $FeSO_4$ or $Fe_2(SO_4)_3$ as the iron source and different MgO as a precipitant and removal agent. Under these circumstances, essentially no iron passes through the filter and the results obtained were excellent. The iron addition gave essentially complete removal when the influent level was 325 coliforms per one hundred ml. Thus, when the filter aid completely removes the iron, the bacteria removals are exceptionally better than those expected for the filter aid, while in those cases where iron is not completely removed the coliform removals were equal to that which would be expected from the filter aid per se, and proportional to the iron removed. Consequently, it is essential to provide sufficient iron so as to form the necessary complex with the microorganisms, but it is also equally important to remove substantially all the iron added, whereby all the bacteria contained in the water may be likewise removed. A significant aspect of the invention is the small amounts of ions that may be used to remove bacteria and viruses, when used in conjunction with filter aids. This is a marked difference from the Chang technique which by necessity employed much greater amounts for comparable removal even though not at practical filtration rates.

TABLE 1.—THE EFFECT OF IRON ADDITION

| Filter Aid | Pressure Drop, p.s.i./hr. | Flow Rate, g./ft.²/min. | Body Feed, mg./l. | Iron Added, mg./l. | Coliforms/100 ml. at Stated Times | | | | | | | | |
|---|---|---|---|---|---|---|---|---|---|---|---|---|---|
| | | | | | Fed | 0.25 hr. | 0.5 hr. | 1.0 hr. | 1.5 hrs. | 2 hrs. | 3 hrs. | 4 hrs. | 5 hrs. |
| Hyflo Super-Cel | 0.2 | 1 | 30 | 0 | 100 | 4 | 13 | 8 | 12 | 8 | 8 | 3 | 7 |
| Do | 3.4 | 1 | 30 | 1.0 | 180 | 0 | 0 | 0 | 0 | 0 | 0 | 0 | 0 |
| Celite 503 | 0.2 | 1 | 30 | 0 | 340 | 70 | 110 | 30 | 70 | 70 | 100 | 80 | 50 |
| Do | 0.4 | 1 | 30 | 0.5 | 460 | 35 | 27 | 11 | 2 | 4 | 4 | 2 | 2 |
| Do | 2.2 | 1 | 30 | 1.0 | 325 | 1 | 0 | 0 | 0 | 0 | 0 | 0 | 0 |
| Celite 545 | 0.1 | 1 | 30 | 0 | 210 | 120 | 130 | 60 | 50 | 60 | 80 | 20 | 30 |
| Do | 1.4 | 1 | 30 | 1.0 | 450 | 0 | 0 | 0 | 0 | 0 | 0 | 0 | 0 |
| Do | 1.4 | 1 | 30 | 1.0 | 510 | 0 | 0 | 0 | 0 | 0 | 0 | 0 | 0 |
| Do | 1.3 | 1 | 30 | 1.0 | 530 | 15 | 2.5 | 0 | 0 | 0 | 0.5 | 0 | 0 |
| Do | 0.1 | 1 | 30 | 0 | 1,300 | 320 | 560 | 400 | 600 | 520 | 400 | 320 | 440 |
| Do | 1.0 | 1 | 30 | *1.0 | 1,030 | 0 | 0 | 0 | 0 | 0 | 0 | 0 | 0 |
| Do | 1.2 | 1 | 30 | 1.0 | 5,400 | 2 | 1 | 5 | 1 | 0 | 0 | 1 | 2 |

*$FeSO_4$, all others $Fe_2(SO_4)_3$.

TABLE 2.—THE EFFECT OF IRON ADDITION

| Filter Aid | Hyflo Super-Cel | | Hyflo Super-Cel | | Iron Coated Diatomaceous Silica Filter Aid | |
|---|---|---|---|---|---|---|
| Pressure Drop, p.s.i./hr | 13.2 | | 11.8 | | 4.5 | |
| Body Feed, mg./l | 30 | | 30 | | 30 | |
| Flow Rate, g./ft.²/min | 1 | | 1 | | 1 | |
| MgO level, mg./l | 0 | | 10 | | 10 | |
| Run Number | 46 | | 58 | | 60 | |
| | Iron, mg./l. | Coliforms, #/100 ml. | Iron, mg./l. | Coliforms, #/100 ml. | Iron, mg./l. | Coliforms, #/100 ml. |
| Determination: | | | | | | |
| Initial Level | 5.0 | 450 | 10.0 | 325 | 1.0 | 250 |
| 0.25 hour | 0.2 | 0 | 2.5 | 30 | | |
| 0.5 hour | 0.2 | 6 | 4.0 | 80 | 0.2 | 27 |
| 1 hour | 0.7 | 100 | 6.0 | 230 | 0.4 | 33 |
| 1.5 hours | 0.3 | 26 | 6.0 | 250 | 0.5 | 13 |
| 2 hours | 0.7 | 40 | 6.0 | 250 | 0.5 | 100 |
| 3 hours | 1.0 | 70 | 4.0 | 390 | 0.6 | 150 |
| 4 hours | 0.8 | 70 | | 270 | 0.7 | 220 |
| 5 hours | 2.0 | 160 | 3.5 | 310 | 0.7 | 160 |

TABLE 3.—THE EFFECT OF INITIAL NUMBER AND FILTER AID TYPE

| Filter Aid | Pressure Drop, p.s.i./hr. | Flow Rate, g./ft.²/hr. | Body Feed, mg./l. | Coliforms/100 ml. at Stated Times | | | | | | | |
|---|---|---|---|---|---|---|---|---|---|---|---|
| | | | | Fed | 0.25 hr. | 0.5 hr. | 1.0 hr. | 1.5 hrs. | 2 hrs. | 3 hrs. | 4 hrs. | 5 hrs. |
| Standard Super-Cel | 0.9 | 1 | 30 | 6 | 0 | 0 | 0 | 0 | 0 | 0 | 0 | 0 |
| Do | 0.8 | 1 | 30 | 34 | 0 | 0 | 0 | 0 | 0 | 0 | 0 | 0 |
| Do | 1.1 | 1 | 30 | 7,000 | 0 | 0 | 0 | 0 | 0 | 0 | 0 | 0 |
| Do | 1 | 1 | 30 | 19,000 | 0 | 0 | 0 | 0 | 1 | 2 | 26 | 3 |
| Celite 512 | 0.3 | 1 | 30 | 20 | 0 | 0 | 0 | 0 | 0 | 0 | 0 | 0 |
| Do | 0.4 | 1 | 30 | 116 | 0 | 1 | 0 | 0 | 0 | 0 | 0.5 | 0.5 |
| Do | 0.4 | 1 | 30 | 1,000 | 2 | 0 | 1 | 3 | 3 | 1 | 3 | 3 |
| Do | 0.4 | 1 | 30 | 14,000 | 36 | 34 | 42 | 43 | 35 | 30 | 70 | 70 |
| Hyflo Super-Cel | 0.2 | 1 | 30 | 5.5 | 0 | 0 | 0 | 0 | 0 | 0 | 0 | 0 |
| Do | 0.2 | 1 | 30 | 14 | 2.5 | 2.5 | 1.5 | 1 | 0.5 | 0.5 | 0.5 | 0.5 |
| Do | 0.2 | 1 | 30 | 2,270 | 20 | 50 | 50 | 70 | 120 | 200 | 190 | 190 |

TABLE 4.—THE EFFECT OF INITIAL NUMBER AND FILTER AID TYPE

| Filter Aid | Pressure Drop, p.s.i./hr. | Flow Rate, g./ft.²/hr. | Body Feed, mg./l. | Coliforms/100 ml. at Stated Times | | | | | | | |
|---|---|---|---|---|---|---|---|---|---|---|---|
| | | | | Fed | 0.25 hr. | 0.5 hr. | 1.0 hr. | 1.5 hr. | 2 hrs. | 3 hrs. | 4 hrs. | 5 hrs. |
| Standard Super-Cel | 1.0 | 1 | 30 | 15 | 0 | 0 | 0 | 0 | 0 | 0 | 0 | 0 |
| Do | 0.8 | 1 | 30 | 225 | 0 | 0 | 0 | 0 | 0 | 0 | 0 | 0 |
| Do | 0.9 | 1 | 30 | 1,900 | 0 | 0 | 0 | 0 | 0 | 0 | 0 | 0 |
| Do | 1.0 | 1 | 30 | 36,000 | 0 | 0 | 0 | 0 | 2 | 0 | 0 | 0 |
| Celite 512 | 0.4 | 1 | 30 | 50 | 0 | 2 | 0.5 | 0 | 0 | 0.5 | 0 | 0 |
| Do | 0.4 | 1 | 30 | 136 | 1 | 1 | 2.5 | 2 | 2.5 | 1.5 | 2 | 1 |
| Do | 0.2 | 1 | 30 | 150 | 3 | 2.5 | 5 | 3.5 | 3.5 | 2 | 1.5 | 2.5 |
| Do | 0.4 | 1 | 30 | 175 | 6 | 4 | 4 | 8 | 7 | 4 | 2 | 1 |
| Do | 0.6 | 1 | 30 | 488 | 0.5 | 0.5 | 0.5 | 1.0 | 2.5 | 0 | 2.5 | 3 |
| Do | 0.3 | 1 | 30 | 570 | 1.5 | 3.0 | 2 | 3 | 3.5 | 2 | 9 | 6 |
| Do | 0.4 | 1 | 30 | 825 | 9 | 11 | 18 | 16 | 22 | 19 | 22 | 30 |
| Do | 0.4 | 1 | 30 | 7,500 | 150 | 230 | 270 | 190 | 190 | 180 | 130 | 160 |
| Do | 0.6 | 1 | 30 | 9,950 | 290 | 280 | 430 | 480 | 340 | 360 | 470 | 400 |

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein, but only in accordance with the appended claims, when read in the light of the foregoing description.

What I claim is:

1. A method of purifying water and particularly bacteria and virus contaminated water comprising adding to said water ions selected from the group consisting of iron, aluminum and mixtures thereof in an amount sufficient to unite with essentially all of said bacteria and viruses, adding pulverulent filter aid and an inorganic chemical compound capable of uniting with said ions to unite with said ions in said water and to affix itself to said filter aid along with said ions and contaminants, and thereafter passing said water through a filter medium.

2. A method as defined in claim 1 wherein said ions are added in an amount between 1 and 5 parts per million, said filter aid in an amount between 5 and 100 parts per million, and said inorganic chemical compound in an amount between 1.0 and 60 parts per million.

3. A method as defined in claim 2 wherein said filter aid is selected from the group consisting of diatomaceous silica, perlite, and mixtures thereof.

4. A method as defined in claim 2 wherein said inorganic chemical compound is an alkali selected from the group consisting of alkali metal carbonates, alkaline earth metal carbonates, alkaline earth metal hydroxides, alkali metal oxides, alkali metal aluminates, alkali metal ferrates, and mixtures thereof.

5. A method as defined in claim 2 wherein said inorganic chemical compound is a powdered active magnesium oxide selected from the group consisting of calcined magnesite, partially calcined dolomite, and mixtures thereof.

References Cited
UNITED STATES PATENTS 3,214,369 10/1965 Felix _____ 210—193 X
2,468,188 4/1949 Frankenhoff _____ 210—75

MICHAEL E. ROGERS, *Primary Examiner.*